United States Patent
Dietl (10) Patent No.: US 6,874,847 B2
(45) Date of Patent: Apr. 5, 2005

(54) DRIVE ARRANGEMENT FOR A MOTOR VEHICLE ROOF ELEMENT WHICH CAN BE SWIVELED INTO A STOWAGE SPACE IN THE VEHICLE FOR DEPOSITION

(75) Inventor: Rudolf Dietl, Munich (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/082,133

(22) Filed: Feb. 26, 2002

(65) Prior Publication Data

US 2002/0125732 A1 Sep. 12, 2002

(30) Foreign Application Priority Data

Mar. 1, 2001 (DE) .......................................... 101 10 014

(51) Int. Cl.⁷ .................................................. B60J 7/12
(52) U.S. Cl. ........................................................ 296/219
(58) Field of Search ................ 296/219, 107.16–107.18, 296/108, 117

(56) References Cited

U.S. PATENT DOCUMENTS

| | | | | |
|---|---|---|---|---|
| 2,272,299 A | * | 2/1942 | Ingildsen et al. | 296/117 |
| 2,274,668 A | * | 3/1942 | Crawford et al. | 296/117 |
| 5,820,206 A | * | 10/1998 | Smith | 296/219 |
| 5,836,644 A | * | 11/1998 | Smith | 296/219 |
| 6,027,162 A | * | 2/2000 | Smith | 296/219 |
| 6,267,433 B1 | * | 7/2001 | Bayer et al. | 296/121 |
| 6,325,452 B1 | * | 12/2001 | Sanders et al. | 296/219 |
| 6,412,859 B1 | * | 7/2002 | Thijssen et al. | 296/219 |

FOREIGN PATENT DOCUMENTS

| | | | |
|---|---|---|---|
| DE | 195 25 587 C1 | 9/1996 | |
| DE | 197 46 569 | 5/1999 | |
| EP | 0 275 184 | 7/1988 | |
| JP | 241823 | * 9/1990 | 296/219 |

* cited by examiner

Primary Examiner—Dennis H. Pedder
(74) Attorney, Agent, or Firm—Nixon Peabody LLP; David S. Safran (57) ABSTRACT

A drive arrangement for a motor vehicle roof with a movable roof part (14) which is connected to a carrier element (11, 111, 225) which can be displaced by a drive element (5, 19, 220) along a given path of motion (8, 219), the drive element (5, 19, 220) engaging a intermediate pivot lever (12, 112, 221) which applies the drive force applied by the drive element (5, 19, 220) via a driver (6, 244) to the carrier element (11, 111, 225) depending on the pivot position of the intermediate lever (12, 112, 221), and the drive arrangement is constructed such that the pivot position of the intermediate lever (12, 112, 221) is determined by the position of the carrier element (11, 111, 225) along the path of motion (8, 219).

35 Claims, 6 Drawing Sheets

DRIVE ARRANGEMENT FOR A MOTOR VEHICLE ROOF ELEMENT WHICH CAN BE SWIVELED INTO A STOWAGE SPACE IN THE VEHICLE FOR DEPOSITION

BACKGROUND OF THE INVENTION

1. Field of the Invention

This invention relates to a drive arrangement for a motor vehicle roof element which can be swiveled into a stowage space for a motor vehicle for deposition, especially for a convertible top.

2. Description of Related Art

German Patent DE 195 25 587 C1 discloses a drive arrangement for a convertible top which can be lowered into a rear convertible top compartment by means of a four-bar mechanism, one of the two connecting rods of the four-bar mechanism arrangement being provided on its end which is permanently coupled to the body with a worm wheel which is driven by a worm which is driven by a compressively stiff drive cable in order to cause a swinging motion of the convertible top into or out of the convertible top compartment.

The disadvantage in this known drive arrangement is the application of force which is constant due to the structure during the swinging process.

SUMMARY OF THE INVENTION

The primary object of this invention is to devise a drive arrangement in which the application of force during the adjustment process can be made variable with simple means.

This object is achieved in accordance with the invention by a drive arrangement for a motor vehicle roof with a movable roof part which is connected to a carrier element which can be moved by means of a drive element along a given path of motion, the drive element engaging an intermediate pivot lever which applies the drive force applied by the drive element via a driver to the carrier element depending on the pivot position of the intermediate lever. Furthermore, the drive arrangement is made such that the pivot position of the intermediate lever is determined by the position of the carrier element along the path of motion.

In this approach according to the invention, it is advantageous that the application of force during the displacement process can be made variable with simple means, especially with few components, in order to increase or decrease the application of force, for example, in the area before reaching the end position.

The invention is described in detail below with reference to the accompanying drawings.

DETAILED DESCRIPTION OF THE INVENTION

Figure 1:
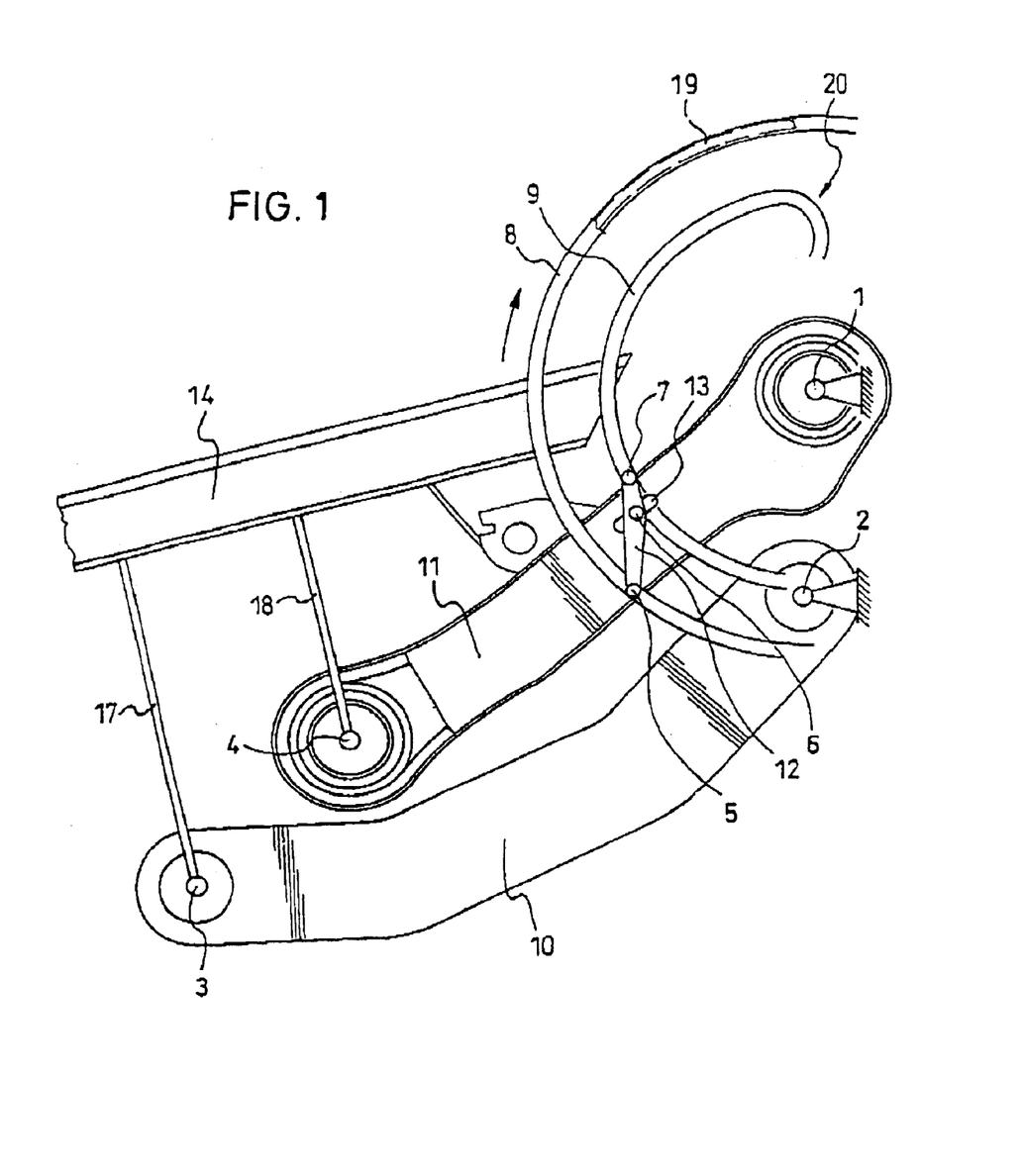
FIG. 1 is schematic a side view of the drive arrangement in accordance with a first embodiment of the invention.
Figure 5:
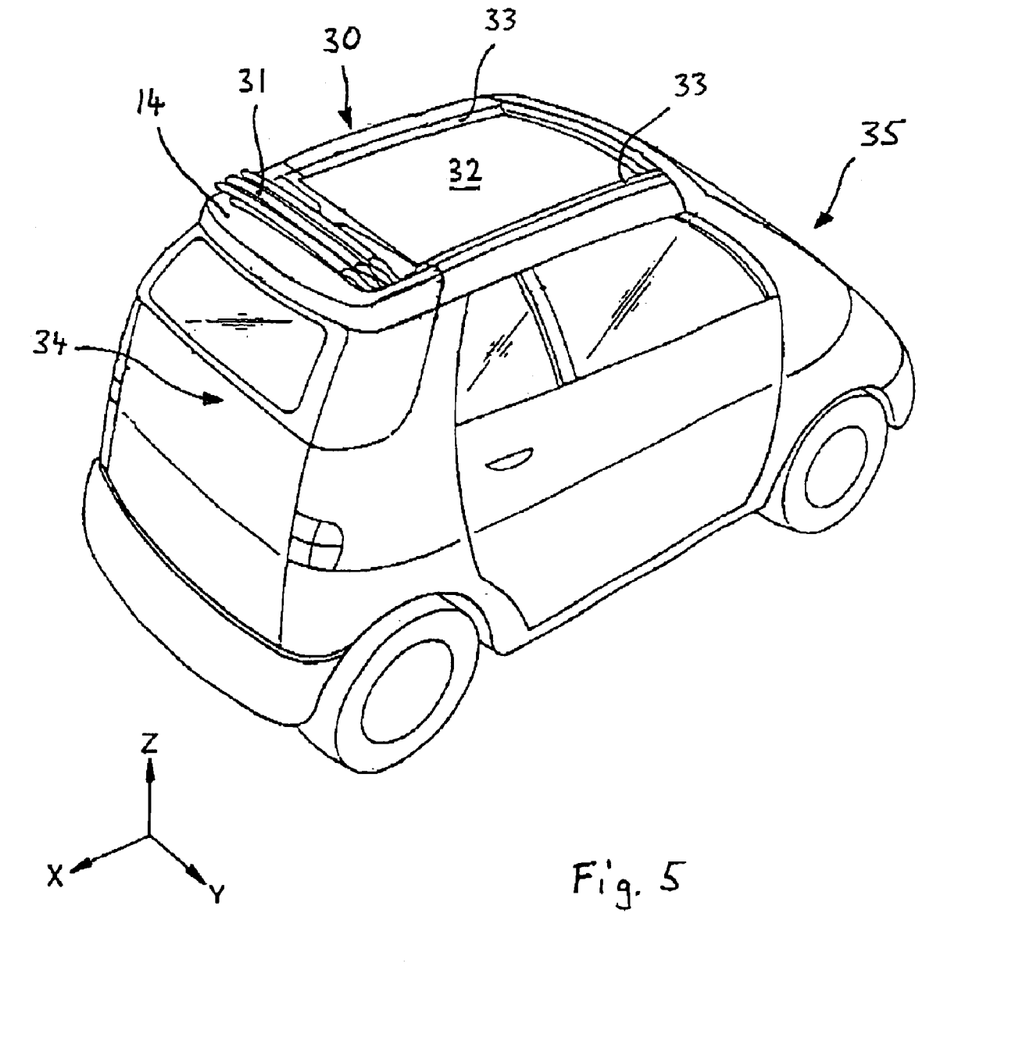
FIG. 5 is a perspective plan view of a motor vehicle with a roof cassette which holds an opened folding roof.
Figure 6:
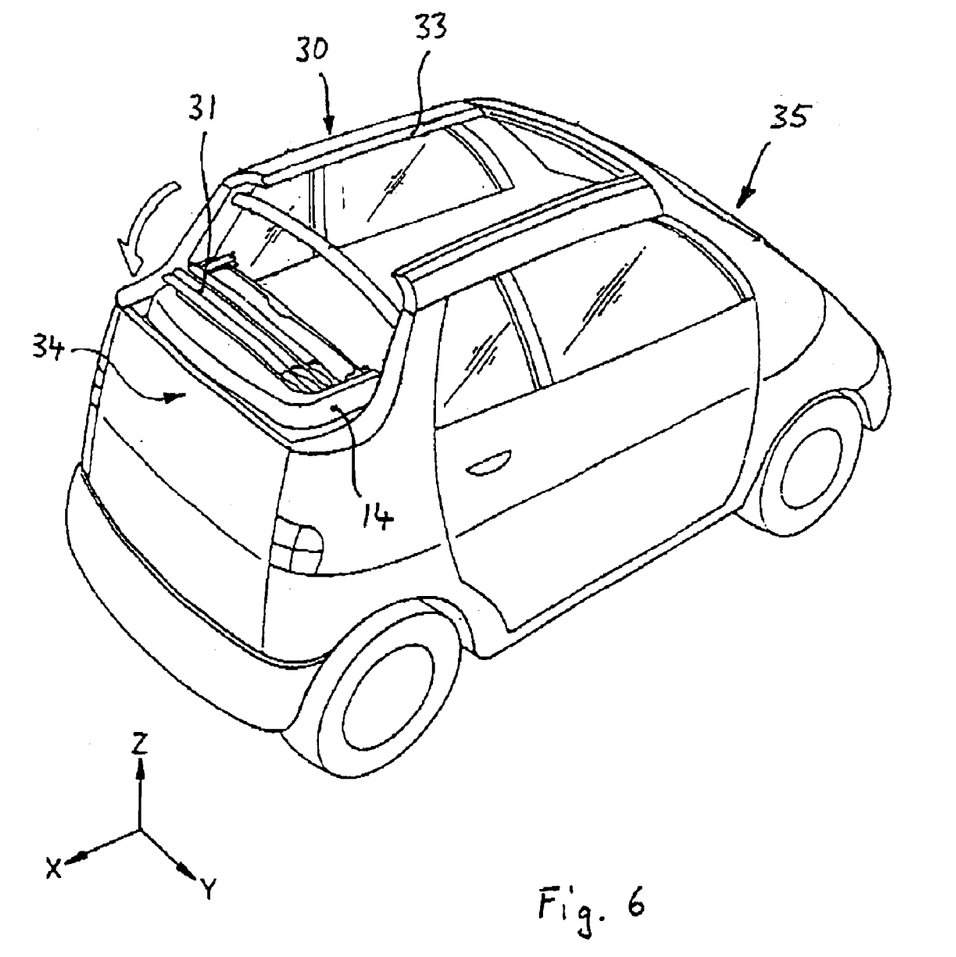
FIG. 6 is a perspective plan view of a motor vehicle with a roof cassette which has been lowered into a stowage space.
Figure 7:
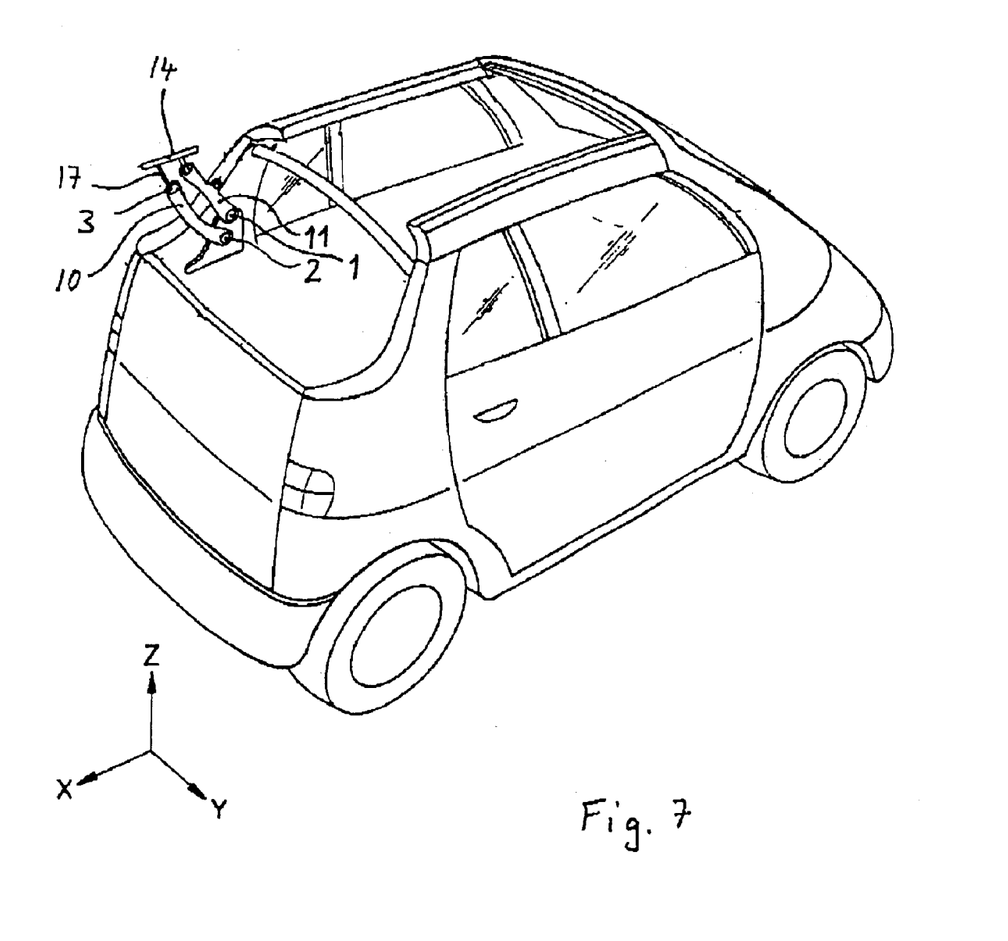
FIG. 7 is a perspective plan view of the motor vehicle with a schematic partial representation of the support of the roof cassette.

FIG. 1 schematically shows a drive arrangement for a roof cassette 14 of an openable motor vehicle roof 30 (see FIG. 5) according to a first embodiment. The roof cassette 14 is used to hold an openable roof element 31 such as, for example, a folding roof (see FIGS. 5 & 6) or a louvered roof. Here, the openable roof element 31, which closes the roof opening 32 flat in its closed position, is pushed by means of a drive (not shown) along lateral guides 33 into the roof cassette (14) in order to clear the roof opening 32, this process also being possible when driving. The roof cassette 14 can, for its part, be swung, by means of the drive arrangement described below, for deposition in a rear stowage space 34 of the motor vehicle 35, especially behind the seats, to completely remove the motor vehicle roof 30 in the manner of a convertible. The roof cassette 14 is pivotally mounted on the body via two schematically shown mounting elements 17, 18 which are connected via hinges 3, 4 to two carrier elements 10, 11 which, for their part, are each pivotally supported at coupling points formed at hinges 2, 1 mounted stationary on the motor vehicle body (see FIG. 7). The hinges 1, 4; 2, 3 are located on the opposing ends of the carrier elements 11, 10. The carrier element 11 acts as a driven connecting rod. The carrier elements 10, 11 with the hinges 1, 2, 3, 4 form a four-bar mechanism arrangement for a roof cassette 14 by which this roof cassette can be lowered into the stowage space 34. FIG. 7 shows the carrier elements 10, 11 and the roof cassette 14 in the intermediate position when the roof cassette 14 is lowered.

The connecting rod 11 in the lengthwise direction is provided with a guide path 13 into which a driver pin 6 which is made on the intermediate lever 12 fits. The intermediate lever 12 on its two ends is provided with a slider 5, 7 which fits into a body-mounted guideway 8, 9 and is guided to slide in it. Thus, the driver pin moves essentially parallel to the longitudinal direction of the connecting rod 11, while the slider 5, 7 moves crosswise relative thereto so that the movement of the driver pin 6 is essentially perpendicular to the movement of the slider 5, 7 relative to connecting rod 11. A compressively stiff drive cable 19 which is driven by a drive which is made in the conventional manner (via a pinion which is driven by an electric motor) engages the slider 5 which lies radially to the outside with respect to the pivot 1 of the connecting rod 11. The radially outside guideway 8 for the slider 5 is made circular in this embodiment. The inner guideway 9 which lies radially inside for the slider 7 runs via wide sections essentially parallel to the outside guideway 8, i.e., it is made likewise circular over significant sections. In the end area 20 of the inner guideway 9, however, its radius is greatly reduced so that the distance between the guideways 8, 9 in this area increases greatly. It is noted that, slider 5 together with drive cable 19 serve as a drive element for the connecting rod 11, connecting rod 11 constituting a carrier element for the movable roof part 14.

If force is applied to the outer slider 5 in the direction of the arrow from the position shown in FIG. 1 by means of the drive cable 19, by engagement of the driver 6 which is located between the two sliders 5, 7 the connecting rod 11 is forced into a pivoting motion clockwise, then the slider 6, 7 being guided in the guideways 8, 9. As long as the distance between the guideways 8, 9 is constant, force is applied to the connecting rod 11 via the driver 6 always at the same location, i.e., at a constant drive force of the drive cable 19 the drive force applied to the connecting rod 11 is likewise constant. In the area of the constant interval the guideways 8, 9 can also be made such that they are on top of one another, i.e., do not have any interval.

But, if the slider 7 travels into the end area 20 of the inner guideway 9 in which its radius decreases, the distance between the guideways 8, 9 increases and the intermediate lever 12 necessarily executes clockwise rotational pivoting motion about the drive element 5, since the slider 7 moves to the inside along the inner guideway 9. In doing so, the driver 6 slides in the guide slot 13 of the connecting rod forming the carrier 11 to the inside, viewed in the radial direction. The rotary motion of the intermediate lever 12 at the same drive speed of the driven slider 5 leads to the pivoting motion of the connecting rod forming the carrier 11 about pivot 1 slowing down. Accordingly, with a uniform driving force of the drive cable 19, the drive force applied to the connecting rod 11 for the roof cassette 14 increases. Therefore, in the end area 20 of the inner guideway 9, stepping down of the driving motion takes place.

The drive motion can be stepped up and the drive force reduced by the distance between the two guideways 8, 9 being reduced by, for example, the radius of the inner guideway 9 being increased.

Basically, it is possible, since for force transfer only the distance between the two guideways 8, 9 is important, instead of the inner guideway 9, to provide the outer guideway 8 with a variable radius. However, since the drive cable runs 19 runs in this outer guideway 8, it is generally preferred that, as shown, the inner guideway 9 is made with a changing radius.

An increase or decrease of the drive force can be desirable not only in the area of the end position of the roof cassette 14, but under certain circumstances, also in intermediate positions.

Figure 2:
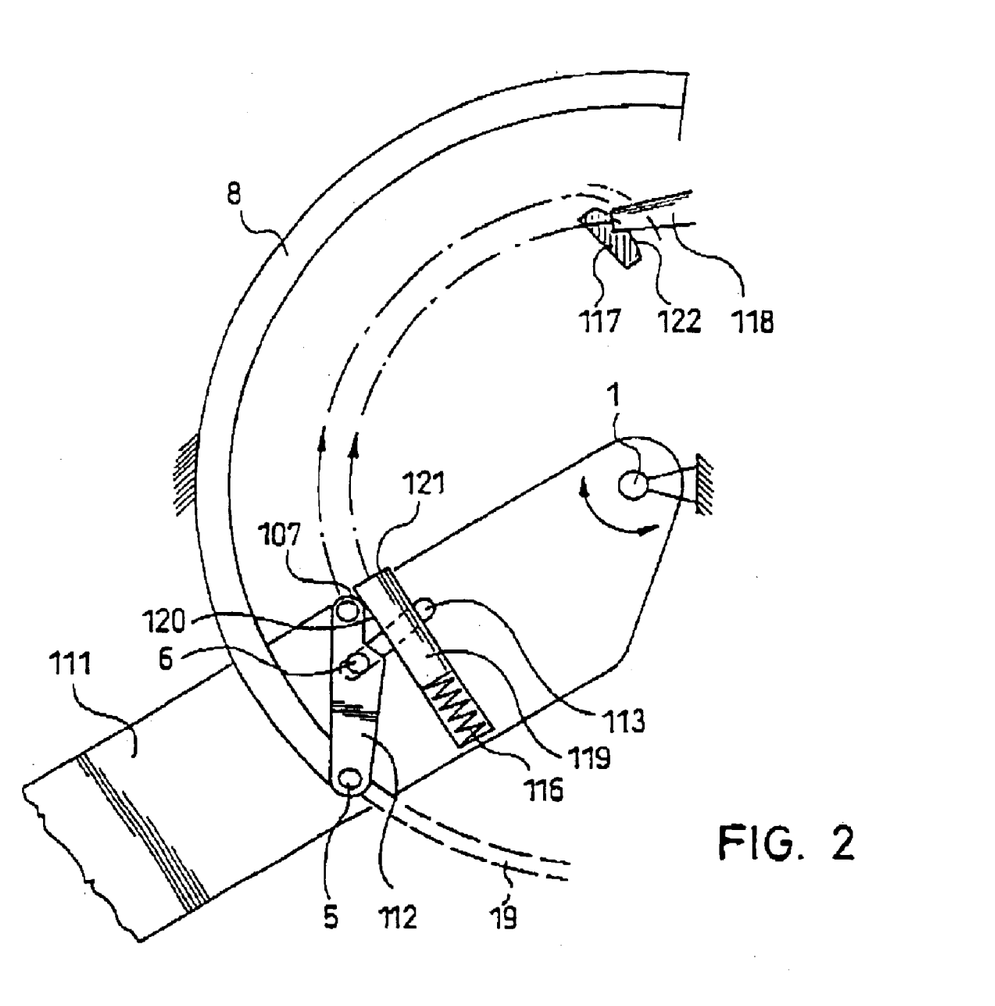
FIG. 2 schematically shows a side view of the drive arrangement in accordance with a second embodiment of the invention.

FIG. 2 schematically shows a second embodiment of the invention, the essential difference being that, in contrast to the embodiment from FIG. 1, the radially inside guideway 9 and the inner slide 7 of the intermediate lever 12, which slide is guided in the latter, are omitted. The dependency of the radial position of the inner end 107 of the intermediate lever 112, i.e., the end nearer the pivot 1 of the connecting rod 111, on the pivot position of the connecting rod 111 is achieved by means of a lock 119 in interplay with a body-mounted stop 118 and a body-mounted sliding cam 117.

The intermediate lever 112, which is made as a toggle lever, is driven on its radial outside slider 5 by a compressively stiff drive cable 19 in a body-mounted circular guideway 8 which has the rotary axis 1 of the connecting rod 111 as the center point. The force is applied to the connecting rod 111 as in the aforementioned embodiment by means of a driver 6 which is made on the intermediate lever 112 and which fits into a guideway 113 which is made in the connecting rod 111 essentially in the radial direction.

The lock 119 can be moved in the connecting rod 111 in an essentially tangential direction, its being pre-tensioned by means of a compression spring 116 into a position (see FIG. 2) in which it forms a contact surface 120 for the inner end 107 of the pivot lever 112 in the radial direction. In this way, in the position of the connecting rod 111 shown in FIG. 2, the radially inner end 107 of the intermediate lever 112 is prevented from moving in the radial direction to the inside; together with the engagement of the driver 6 in the guideway 113, this provides for fixing of the intermediate lever 112 relative to the connecting rod 111. In this position, thus, at a constant drive speed and drive force, the connecting rod 111 moves with a constant speed and constant force via the drive cable 19 and the outer slider 5. In the embodiment of FIG. 1, this state corresponds to the area in which the two guideways 8, 9 run with a constant distance between them, i.e., concentrically.

The sliding cam 117 and the stop 118 lie in different planes, the stop 118 being located such that with the corresponding angular position of the connecting rod 111, the lock 119 with its front end 121 runs against the stop 118 and then is pushed back accordingly against the pre-tensioning force of the compression spring 116 in the tangential direction. In this way, the contact of the radially inside end 107 of the intermediate lever 112 with the contact surface 120 of the lock 119 which points radially to the outside is ended, by which the end 107 is released. The sliding cam or the sliding cam element 117 is made such that, after the lock 119 is pushed back by the stop 118, the radially inside end 107 of the intermediate lever 112 makes contact with the contact surface 122 of the sliding cam element 117, by which the radial position of the inner end 107 of the intermediate lever 112 is now determined by the shape of the contact surface 122. It is shaped as shown in FIG. 2 such that the inner end 107 of the intermediate lever 112, as the pivoting motion of the connecting rod 111 continues around the axis 1 of rotation in the direction of the arrow, i.e., clockwise, can move radially to the inside; in interaction with the guide of the driver 6 in the guide slot 113 of the connecting rod 111 and the continued constant application of force to the slider 5 leads to a rotational pivoting motion of the intermediate lever 112 clockwise. The shape of the contact surface 122 of the sliding cam element 117 corresponds to the shape of the inner guideway 9 from FIG. 1 in its end area 20.

The rotational pivoting motion of the intermediate lever 112 achieved thereby, in the embodiment as shown in FIG. 2, has the same effects as in the embodiment as shown in FIG. 1, i.e., the pivoting motion of the guide rod 111 slows down while the force accordingly increases so that stepping-down of the drive motion of the connecting rod 111 takes place in the end region of the pivoting area.

One advantage of the embodiment as shown in FIG. 2 is that the inner guideway of the embodiment as shown in FIG. 1 can be omitted for the most part, i.e., with the exception of the sliding cam element 117; this can lead to advantages in terms of construction space and/or costs. Nonetheless, the movement of the driver pin 6 is still essentially perpendicular to the movement of the slider 5, 7 relative to connecting rod 111.

Even if the invention so far has been described with reference to a drive provided with a drive cable, the application of the driving force to the intermediate lever 12, 112 is fundamentally possible in a different manner, for example, by means of a drive rod.

Figure 3:
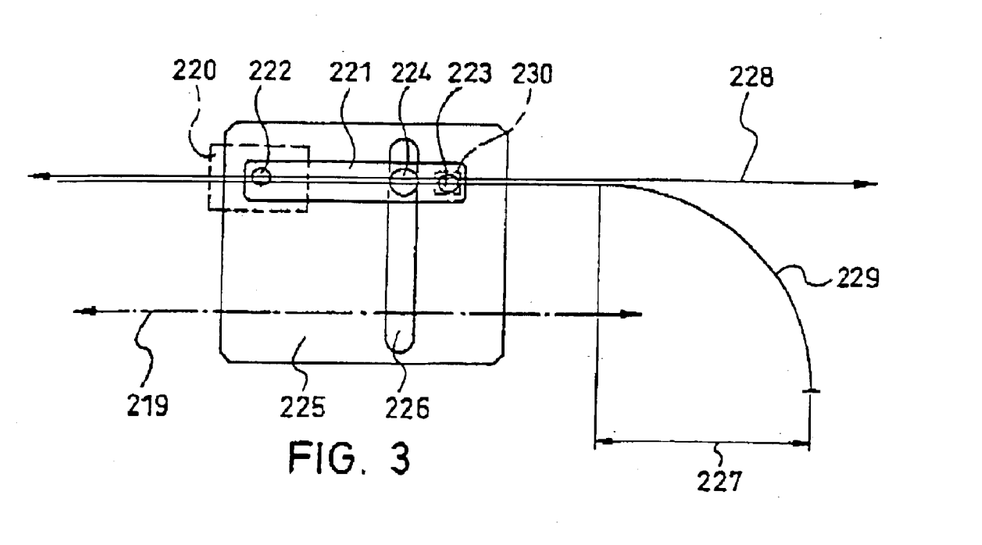
FIG. 3 is a schematic side view of the drive arrangement according to a third embodiment of the invention.
Figure 4:
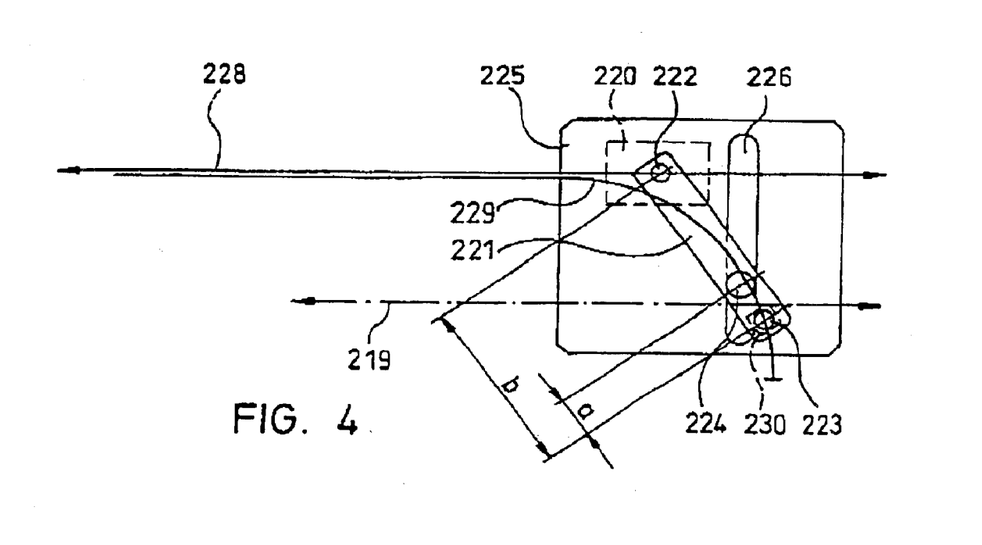
FIG. 4 shows the embodiment of FIG. 3 in another position.

This invention is not limited to the drive of a connecting rod, i.e., a lever which is pivotally coupled to the body on one end, but the adjustable roof parts can in general be driven along a given path of motion, as is shown in FIGS. 3, 4 for a slider plate 225 as the driven roof part to which, for example, the roof tip of a folding roof guided on roof-mounted guides is attached.

The slider plate 225 is guided by a guide means which is not shown along a body-mounted guideway, for example a guide rail, on a stipulated path 219 of motion. This example is a linear section; the path of motion or the guide rail 219 could also be curved if necessary.

The slider plate 225 can also be, for example, a driven element of the roof mechanism for a folding roof, a convertible top, a sliding roof, a sliding and lifting roof, a louvered roof or a spoiler roof.

A compressively-stiff drive cable (not shown) which is driven preferably via a pinion by the electric motor runs in a cable channel 228 and is rigidly connected to a slider 220 which is guided in the cable channel 228 and is connected via a hinge 222 to one end of an intermediate lever which is made as a toggle lever 221. The other end of the toggle lever 221 is guided via a slider 230 which is connected via a hinge 223 in the guide channel 229. Between the hinges 222, 223, the toggle lever 221 has a driver 224 which is made as a guide pin and which fits into a guide slot 226 which is made in the slider plate 225. The crank slot 226, as necessary, can be made straight or curved. In this example, it is made straight and runs perpendicular to the direction of motion 219 of the slider plate. In this embodiment, the slider 220 and the drive cable form a drive element acting on the driver 224 to move the carrier element formed by the slider plate 225 based on the position of the intermediate lever formed by toggle lever 221.

Aside from the cam area labeled with reference number 227, the guide channel 229 for the slider 230 runs straight and parallel to the guide channel 228 for the slider 220. The guide channel 228 runs straight over its entire illustrated length. In the parallel area, the guide channels 228, 229 run essentially over one another so that the toggle lever 221 in this area, as shown in FIG. 3, lies essentially horizontal. In the curved section 227, the guide channel 229 runs away from the guide channel 228, i.e., the distance between the guide channels 228, 229 increases.

The drive force imparted by the drive cable is applied to the slider plate 225 via the slider 220, the toggle lever 221 and finally the driver 224. In the position shown in FIG. 3, in which the two sliders 220, 230 are located in the straight area of the guide channels 228, 229, the application of force is constant at a constant driving force of the drive cable.

However, as soon as the slider 230 enters the curved area 227 of the guide channel 229, the toggle lever 221 is forced into pivoting motion around the hinge 222 of the slider 220, by which the driver 224 in the crank slot 226 slides down. As a result of this swivelling motion of the toggle lever 221, at a constant speed of the slider 220, the motion of the driver 224 slows down (i.e., the corresponding motion component decreases) and as does the slider plate 225 in the direction 219 at the same time; this causes a corresponding increase of the driving force with respect to the direction 219. In this way, stepping-down of the drive motion in the direction 210 is achieved in the direction 210 in the area of the curved section 227 of the guide channel 229.

The step-up ratio is determined on the one hand by the dimensioning of the toggle lever, i.e., the ratio between the distance b between the hinge 222 and the driver 224 and the distance a between the driver 224 and the hinge 223, and on the other hand, by the configuration of the curved section 227 of the guide channel 229, and can be adjusted accordingly via these parameters for the respective application.

The application of a driving force to the slider plate 225 depends on the pivot position of the toggle lever 221 which, in turn, depends on the position of the slider plate 225 along its path of motion. In this way, application of the driving force which is variable as necessary is enabled.

Instead of being determined by means of engagement of the slider 230 in the guide channel 229, the pivot position of the toggle lever 221 can also be determined, as in the embodiment shown in FIG. 2, by a lock element which is actuated, for example, by a stop depending on the position of the slider plate 225, and which, in the unactuated state, forms a contact surface for the guide point of the toggle lever 221 which corresponds to the slider 230. In this modification, the guide channel 229 can be completely eliminated at least with respect to its straight section, and the curved section can be replaced by a curved contact surface, as in FIG. 2.

In principle, this invention enables any adjustable, variable application and step-up/step-down of the drive force with a reliable mechanical embodiment and with low construction space requirement.

What is claimed is:

1. Drive arrangement for a motor vehicle roof with a movable roof part, comprising:

a carrier element having a given path of motion relative to a motor vehicle body, in an installed state of the drive arrangement, and a coupling point for connection to the movable roof part; and a drive element which is mounted so as to be movable relative to the carrier element in defined directions of movement, an intermediate pivot lever, a first part of said intermediate lever being connected to a driver and at least one guide, and said driver having a path of movement which is perpendicular to the defined directions of movement of the drive element relative to said carrier element, said driver being pivotably and displaceably connected to said carrier element in a manner enabling a drive force applied by the drive element to be transmitted to the carrier element for displacing the carrier element along said given path of motion dependent on a then current pivot position of the intermediate lever along said at least one guide and a then current position of the carrier element along the path of motion.

2. Drive arrangement for a motor vehicle roof with a movable roof part, comprising:

a carrier element having a given path of motion relative to a motor vehicle body, in an installed state of the drive arrangement, and a drive element which is mounted so as to be movable relative to the carrier element, an intermediate pivot lever, a first part of said intermediate lever being connected to a driver and at least one guide, and said driver having a path of movement relative to said carrier element, said driver having a pivotable and displaceable connection to said carrier element in a manner enabling a drive force applied by the drive element to be transmitted to the carrier element for displacing the carrier element along said given path of motion dependent on a then current pivot position of the intermediate lever along said at least one guide and a then current position of the carrier element along the path of motion;

wherein the carrier element is a connecting rod having a first coupling point for coupling to a body-mounted point and also a second coupling point for coupling to a roof part which is pivotable, in an installed state of the drive arrangement, into a stowage space of a motor vehicle; and wherein the connecting rod is pivotable along a path which is dictated by the body-mounted point; wherein the driver is movably guided on the connecting rod in a radial direction relative to said first coupling point by the pivotable and displaceable connection; and wherein a radial position of a guide point of the intermediate lever is determined by the pivot position of the connecting rod and the position of the intermediate lever along said at least one guide, and wherein the driver is located between the drive element and the guide point.

3. Drive arrangement as claimed in claim 1, wherein the driver is a guide pin engaged in a guide path in the carrier element.

4. Drive arrangement as claimed in claim 1, wherein the drive element engages a first guide point on the intermediate pivot lever which is guided in a first guideway for provision on a vehicle body.

5. Drive arrangement as claimed in claim 4, wherein a second guide point is provided on the intermediate pivot lever, and where the second guide point is positioned, along a path in a direction perpendicular to the direction of motion of the drive element, at a location which is determined by the position of the carrier element along the path of motion of the carrier element.

6. Drive arrangement as claimed in claim 5, wherein the intermediate pivot lever is guided at the second guide point by a second guideway for provision on the vehicle body, the guideways controlling pivoting motion of the intermediate lever.

7. Drive arrangement as claimed in claim 6, wherein the first guideway and the second guideway run parallel to each other over one section thereof and divergently relative to each other over another section thereof.

8. Drive arrangement as claimed in claim 5, further comprising a lock element mounted on the carrier element and which forms a contact surface for the second guide point of the intermediate pivot lever, the lock element being actuated to clear the second guide point when the carrier element reaches a predetermined position.

9. Drive arrangement as claimed in claim 8, wherein the lock element is pre-stressed into the position which blocks the second guide point, actuation of the lock element taking place by displacement of the lock element.

10. Drive arrangement as claimed in claim 8, wherein a stop element for mounting on a vehicle body is provided for actuating the lock element in the end area of the carrier element to release the second guide point; and wherein a guide cam for mounting on a vehicle body is provided for the second guide point in an area of the stop element.

11. Drive arrangement as claimed in claim 10, wherein the guide cam for the second guide point is formed by a contact surface.

12. Drive arrangement as claimed in claim 5, wherein the driver lies between the two guide points.

13. Drive arrangement as claimed in claim 1, wherein the drive element comprises a compressively-stiff cable.

14. Drive arrangement as claimed in claim 1, wherein the carrier element is guided along a guide rail.

15. Drive arrangement as claimed in claim 1, wherein the carrier element is a connecting rod for coupling to a body-mounted point and also to a roof part which is pivotable, in an installed state of the drive arrangement, into a stowage space of a motor vehicle, and wherein the connecting rod is pivotable along a path which is dictated by the body-mounted point.

16. Drive arrangement as claimed in claim 15, wherein the driver is movably guided in the radial direction on the connecting rod.

17. Drive arrangement as claimed in claim 16, wherein the driver comprises a guide pin which is disposed in a guide slot in the connecting rod.

18. Motor vehicle comprising:
a vehicle body,
at least one movable roof part for closing and opening a roof opening of the vehicle body, and
a drive arrangement having:
a carrier element having a given path of motion relative to the motor vehicle body and a coupling point for connection to the movable roof part; and
a drive element which is mounted so as to be movable relative to the carrier element,
an intermediate pivot lever, a first part of said intermediate lever being connected to a driver, and
said driver having a path of movement which is perpendicular to the movement of the drive element relative to said carrier element, said driver being pivotably and displaceably connected to said carrier element in a manner enabling a drive force applied by the drive element to be transmitted to the carrier element for displacing the carrier element along said given path of motion dependent on a then current pivot position of the intermediate lever and a then current position of the carrier element along the path of motion.

19. Drive arrangement as claimed in claim 2, wherein a radial distance of a connection point of the drive element to the intermediate lever from the body-mounted point of the connecting rod is constant over a range of pivoting movement of the connecting rod.

20. Drive arrangement as claimed in claim 19, wherein the drive element engages the intermediate lever via a slider, the slider being guided in an arc-shaped guideway that has a center point which is the body-mount point for coupling to the connecting rod.

21. Drive arrangement as claimed in claim 15, wherein the drive element engages the intermediate lever at a point which lies radially farther to the outside than the driver.

22. Drive arrangement as claimed in claim 15, wherein the radial distance of the guide point of the intermediate lever from the body-mounted point for coupling to the connecting rod varies with the pivot position of the connecting rod.

23. Drive arrangement as claimed in claim 22, wherein the radial distance of the guide point of the intermediate lever from the body-mounted point for coupling to the connecting rod decreases at the end of the pivoting motion of the connecting rod and is otherwise substantially constant.

24. Drive arrangement as claimed in claim 2, wherein the guide point of the intermediate lever is guided in a vehicle body mounted guideway, the guideway running around the first coupling point of the connecting rod at a radius which depends on the pivot angle of the connecting rod.

25. Drive arrangement as claimed in claim 2, wherein a lock element is mounted on the connecting rod and which forms a contact surface for the guide point of the intermediate lever in a radial direction, the lock element being actuated to clear the guide point in the radial direction depending on the pivot position of the connecting rod.

26. Drive arrangement as claimed in claim 25, wherein the lock element is pre-stressed into the position which blocks the guide point.

27. Drive arrangement as claimed in claim 25, wherein the lock element has an actuation direction which is in an essentially tangential direction relative to the path of motion.

28. Drive arrangement as claimed in claim 25, wherein a stop element for mounting on a vehicle body is provided for actuating the lock element in the end area of the carrier element to release the guide point; and wherein a guide cam for the guide point for mounting on a vehicle body is provided in an area of the stop element.

29. Drive arrangement as claimed in claim 28, wherein a guide curve for the guide point has a decreasing radius with respect to the body-mounted point to which the connecting rod is adapted to be coupled.

30. Drive arrangement as claimed in claim 29, wherein the guide cam for the guide point is a contact surface.

31. Drive arrangement as claimed in claim 1, wherein a bearing lever is provided for coupling to a point on a vehicle body, which has a hinge for coupling to movable roof parts, and which forms a four-bar mechanism arrangement for a pivot element together with the carrier element.

32. Motor vehicle as claimed in claim 18, wherein the carrier element is a connecting rod which is coupled to a body-mounted point and is also coupled to the roof part which is pivotable into a stowage space of the motor vehicle body, and wherein the connecting rod is pivotable along a path which is dictated by the body-mounted point.

33. Motor vehicle as claimed in claim 32, wherein the roof part which is pivotable is a roof cassette into which said at least one movable roof part is rearwardly displaceable from a position thereof which closes the motor vehicle roof to a position thereof which clears the roof opening, and wherein the stowage space is located in the rear of the motor vehicle.

34. Motor vehicle as claimed in claim 18, wherein a guide point of the intermediate lever is guided in a guideway mounted on the vehicle body, the guideway running around a coupling point of the connecting rod at a radius which depends on the pivot angle of the connecting rod.

35. Motor vehicle as claimed in claim 34, wherein a stop element is mounted on the vehicle body for actuating the lock element in the end area of the carrier element to release the guide point; and wherein a guide cam for the guide point is mounted on the vehicle body in an area of the stop element.

* * * * *